United States Patent [19]

Steele

[11] 4,349,274

[45] Sep. 14, 1982

[54] OPTICAL TRIANGULATION APPARATUS AND METHOD

[75] Inventor: Douglas S. Steele, Mechanicville, N.Y.

[73] Assignee: General Electric Company, Cincinnati, Ohio

[21] Appl. No.: 171,513

[22] Filed: Jul. 23, 1980

[51] Int. Cl.³ .............................................. G01C 3/10
[52] U.S. Cl. ...................................... 356/1; 250/560; 356/381
[58] Field of Search ..................... 356/1, 381; 250/560

[56] References Cited

U.S. PATENT DOCUMENTS

| | | | |
|---|---|---|---|
| 3,016,464 | 1/1962 | Bailey | 250/560 |
| 3,536,405 | 10/1970 | Flower | 356/381 |
| 3,692,414 | 9/1972 | Hosterman et al. | 356/4 |
| 3,923,395 | 12/1975 | Bodlaj | 356/4 |
| 4,053,227 | 10/1977 | Bodlaj | 356/4 |
| 4,102,571 | 7/1978 | Hayamizu et al. | 356/1 |
| 4,111,552 | 9/1978 | Bodlaj | 356/4 |
| 4,136,949 | 1/1979 | Hayamizu et al. | 356/1 |
| 4,146,327 | 3/1979 | Harris | 356/1 |

FOREIGN PATENT DOCUMENTS 2842670  4/1980  Fed. Rep. of Germany ...... 356/381

*Primary Examiner*—S. C. Buczinski

*Attorney, Agent, or Firm*—Carl L. Silverman; Derek P. Lawrence

[57] ABSTRACT

The apparatus includes a light source for directing a measuring beam toward a workpiece and a photo detector positioned to receive a portion of the measuring beam reflected from the workpiece. A beam splitter is positioned between the light source and the workpiece to reflect a portion of the light source measuring beam to a monitor photo detector. The monitor photo detector receives the beam splitter reflected beam and provides an output signal representative of the position of the beam splitter reflected beam, and hence, the position of the light source with respect to an idealized position. In one embodiment, the photo detector develops a monitor output signal representative of the deviation between an Idealized Centerline and an Actual Centerline of the light source. The monitor output signal may be employed for display purposes. The monitor output signal may also be employed with positioning means to displace the light source from its actual position toward the ideal position so as to reduce the measurement error associated with the actual position of the light source. Also, the monitor output signal may be employed to develop a compensating signal for reducing the measurement error associated with the actual position of the light source.

8 Claims, 6 Drawing Figures

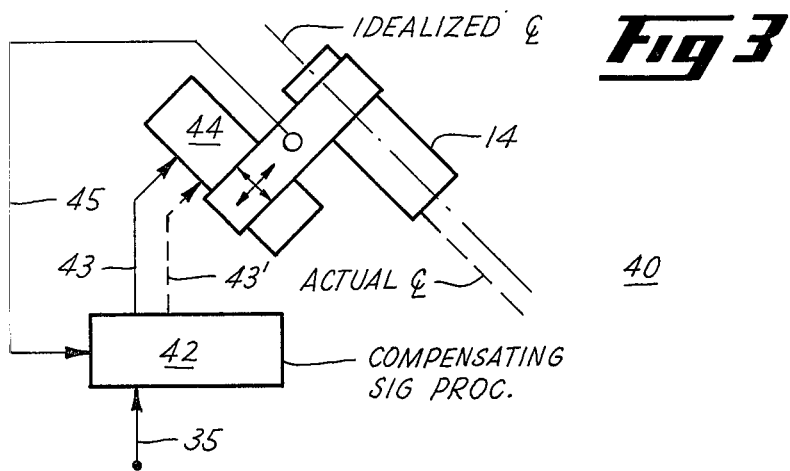
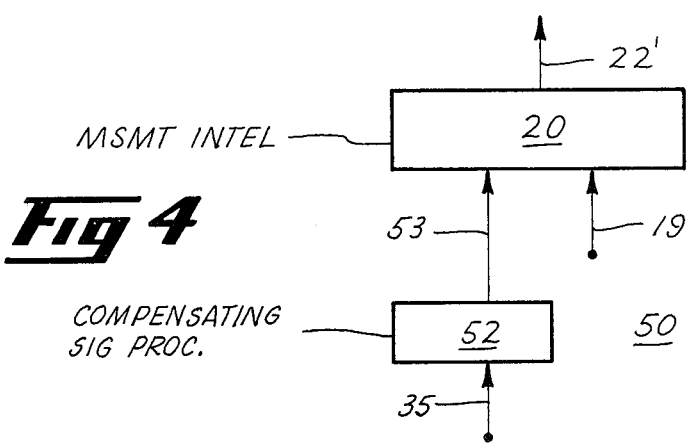
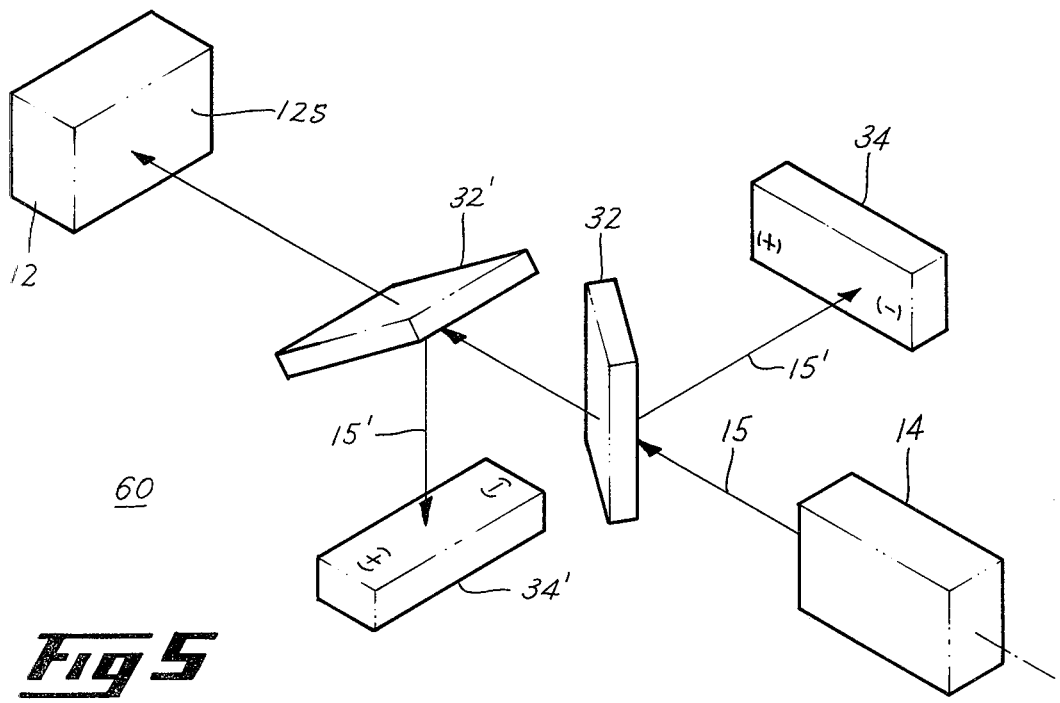

OPTICAL TRIANGULATION APPARATUS AND METHOD

The invention herein described was made in the course of or under a contract, or a subcontract thereunder, with the United States Department of the Air Force.

BACKGROUND OF THE INVENTION

The present invention relates to apparatus and methods for optical triangulation measurement of the type employing a measuring beam, and, more particularly, to such apparatus and method in which the position of the measurement beam affects the measurement accuracy.

Optical triangulation systems have been commonly employed for measurement and for inspection applications. For example, one such prior art optical triangulation system is shown in FIG. 1A and is generally designated 10. In the system 10, a workpiece 12 is positioned to receive the light output of a light source 14. The light source 14 is shown as having an Idealized Centerline along which the light source measuring beam 15 is directed. The Idealized measuring beam 15 strikes surface 12S of the workpiece 12 at point $A_1$ and is then reflected back through focusing lens 16 until it impacts as point $A_i$ on photo detector 18. A reference plane, designated REF, is provided. Point B is defined by the intersection between the reference plane and the Idealized Centerline of the light source 14. The reflection from point B through focusing lens 16 is at impact point B' on photo detector 18. For reasons which will be more fully understood later, impact point B' is taken as the reference or zero point of photo detector 18.

The reflection of the Idealized measuring beam 15 from the surface 12S (from point $A_1$) at point $A_i$ on photo detector 18 is a measure of the distance between the reference plane and the surface 12S. More particularly, the distance between $A_i$ and B' is related through similar triangles to the distance between B and $A_1$. The distance $A_i$ to B' (zero point) is simply processed to give the distance d between the referece plane and the surface 12S. The output 19 of the photo detector 18 typically comprises an electrical signal which contains information representative of the distance between $A_i$ and B' (zero point). This output signal is typically received by measurement intelligence 20 which interprets the electrical signal and produces a measurement output signal 22 representative of the distance d.

Although the system 10 of FIG. 1A is successful for many applications, one problem with such system occurs due to drift of the light source 14. More particularly, thermal and other conditions often cause drifting of the light source 14 so that the light source 14 may be positioned with an Actual Centerline which is displaced from the Idealized Centerline. For example, in FIG. 1A, an Actual Centerline is shown in phantom parallel to, but displaced from, the Idealized Centerline wherein the measuring beam 15 impacts surface 12S at point $A_2$ instead of $A_1$. It is important to appreciate that such displacement of the light source 14 results in the reflected measuring beam impacting on the photo detector 18 at a point displaced from where it would have inpacted had the light source been positioned on the Idealized Centerline. More particularly, the measuring beam 15 on the phantom Actual Centerline impacts the photo detector 18 at point $A_a$ instead of point $A_i$. Thus, under these drift conditions, the photo detector output 19 will be incorrect due to the measurement error introduced by the displacement of the light source 14 from the Idealized Centerline position.

Another commonly employed triangulation measurement system is shown in FIG. 1B and is generally designated 25. The system 25 is substantially the same as the system 10 of FIG. 1 so that, whenever possible, like reference numerals are employed to represent like elements. The system 25 is representative of optical triangulation measurement systems in which a photo detector 18 is positioned to receive a portion of the measuring beam 15 which is reflected from the surface 12S of the workpiece 12. The portion of the reflected measuring beam received at photo detector 18 is characterized as being representative of the point of impact of the measuring beam on the workpiece 12. In this connection, as in FIG. 1A, a reference or zero point is typically provided on the photo detector 18. For purposes of clarity, the reference plane is not shown in FIG. 1B. In FIG. 1B, centerline drift is shown wherein the Actual Centerline of the light source 14 is shown displaced, resulting in impact point $C_a$ on the surface 12S, but, due to the apparatus having an Idealized Centerline, the photo detector 18 interprets the point of impact on the surface 12S to be idealized point $C_i$, resulting in a measurement error.

Accordingly, it is a general object of this invention to provide methods and apparatus of optical triangulation measurement for reducing the measurement error introduced as a result of light source centerline drift.

Another object of the present invention is to provide such method and apparatus wherein the relationship between the Idealized Centerline and the Actual Centerline is monitored.

Another object of the present invention is to provide such method and apparatus which includes translating the light source to reduce the measurement error.

Another object of the present invention is to provide such method and apparatus which includes compensation for the measurement error otherwise introduced by the displacement of the Actual Centerline from the Idealized Centerline.

SUMMARY OF THE INVENTION

Optical triangulation measurement apparatus is provided of the type having a light source positioned to provide a measuring beam directed to a workpiece. The light source has an idealized centerline and an actual centerline with the deviation therebetween introducing a measurement error. A photo detector is positioned to receive a portion of the measuring beam reflected from the workpiece with a portion of the reflected measuring beam characterized by being representative of the point of impact of the measuring beam on the workpiece. The photo detector develops a photo detector output signal representative of the point of impact of the measuring beam on the photo detector. Measurement intelligence means is provided for receiving the photo detector output signal and developing a measurement output signal representative of the point of impact of the measuring beam on the workpiece. Means is provided for monitoring the relationship between the idealized centerline and the actual centerline and developing an output signal representative of the deviation therebetween.

BRIEF DESCRIPTION OF THE DRAWINGS

For a better understanding of the invention, reference may be had to the following description, taken in conjunction with the accompanying drawings, wherein:

FIG. 3 is a schematic and functional block representation showing further details of a portion of the apparatus of FIG. 3 wherein the light source is translated to reduce the measurement error.

FIG. 4 is a functional block diagram of a portion of the apparatus of FIG. 2 wherein the measurement error is reduced through compensating signal processing.

FIG. 5 is a highly schematic representation of a portion of the apparatus of FIG. 2 showing a three-dimensional application.

DETAILED DESCRIPTION OF THE INVENTION

Figure 1A:
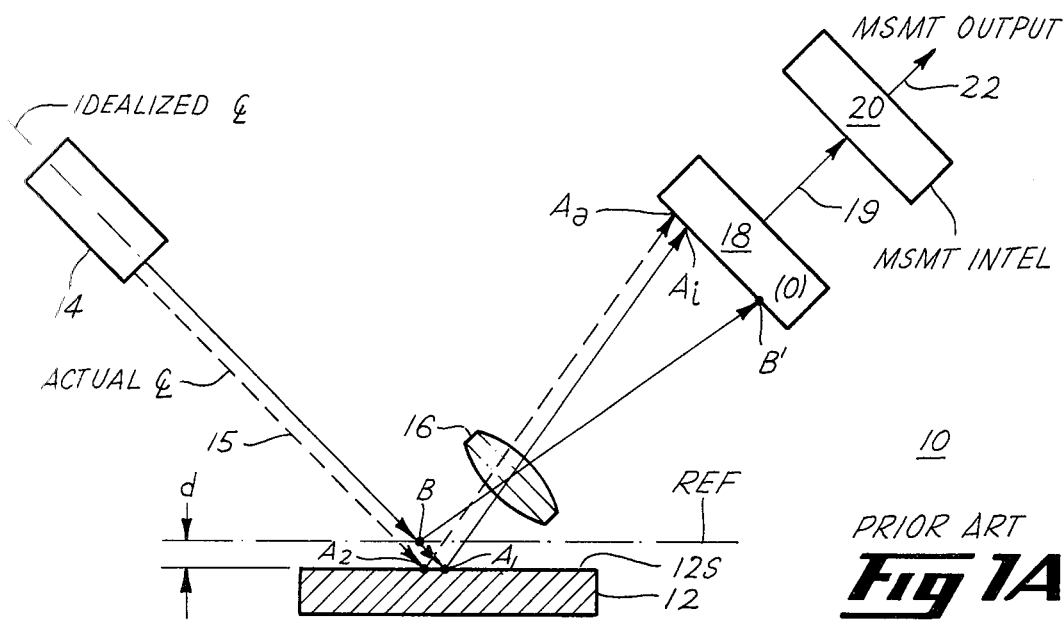
FIGS. 1A and 1B are schematic representations of Prior Art optical triangulation apparatus to which the present invention relates.
Figure 1B:
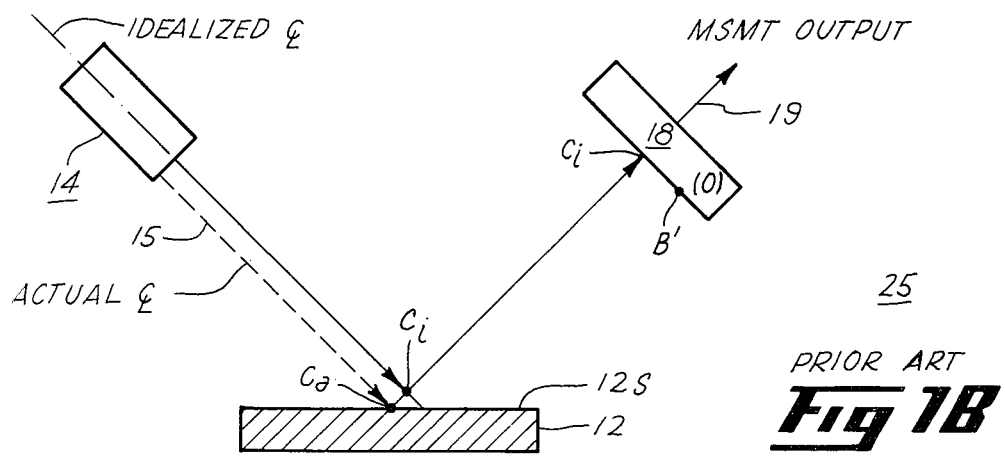
Figure 2:
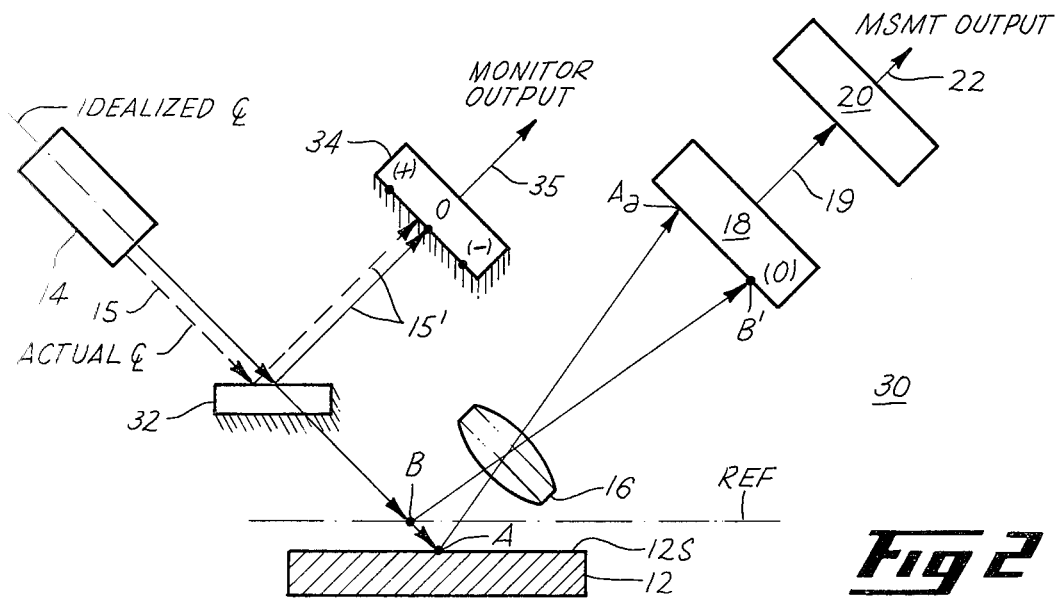
FIG. 2 is a schematic representation showing one form of optical triangulation measurement apparatus of the present invention.

Referring initially to FIG. 2, one form of optical triangulation apparatus of the present invention is generally designated 30. The optical triangulation apparatus 30 is essentially the same as the optical triangulation system 10 of FIG. 1A so that, where possible, like reference numerals have been used to designate like elements.

The optical triangulation apparatus 30 further includes means for monitoring the relationship between the Idealized Centerline and the Actual Centerline and developing a monitor output signal representative of the deviation therebetween. More particularly, in one form of the invention, a beam splitter 32 is disposed between the light source 14 and the workpiece 12. The beam splitter 32 is a conventional device, appropriately selected with regard to the wavelength of the measuring beam. The beam splitter 32 is positioned to intercept the measuring beam 15, allowing the majority of the light energy to pass therethrough undisturbed while reflecting a smaller amount of light energy therefrom. Thus, the measuring beam 15 passes through the beam splitter 32 and crosses points B and A, as in FIG. 1A. The reflected measuring beam 15' from the beam splitter 32 is directed to a monitor photo detector 34. Monitor photo detector 34 is a conventional device, such as a bifurcated silicon photodiode. Photo detector 34 is employed to monitor the position of the measuring beam 15 through the position of the reflected measuring beam 15'. For example, as shown in FIG. 2, the photo detector 34 may simply comprise a negative/positive photo detector wherein a center, or reference position, is a zero position. More particularly, measuring beam 15' input at the zero position may result in a monitor output signal 35 representative of zero polarity, whereas measuring beam 15' input between zero and a negative point will result in progressive magnitudes of negative polarity. Similarly, measuring beam 15' input between a zero point and a positive polarity will result in a monitor output signal 35 progressively positive. The beam splitter 32 and the monitor photo detector 34 are positioned so as to be free of spatial drift.

Thus, the beam splitter 32 and the monitor photo detector 34 independently monitor the actual position of the light source 14. More particularly, consider the situation in which the light source 14 drifts to the Actual Centerline position shown in FIG. 2. This light source drift is detected by photo detector 34 which then produces a monitor output signal 35 representative of such drift. For purposes of illustration, this drift is shown as producing a positive polarity output signal.

The monitor output signal 35 of the photo detector 34 may be used in may ways. For example, the monitor output signal 35 may simply be employed as an indication that the actual position of the centerline of the light source is displaced from the idealized position. In such applications, the monitor output signal may be employed to activate a display and/or alarm. For certain applications, it may be desirable to employ the monitor output signal 35 to depict, e.g., display and/or store, a representative of the deviation between the Actual Centerline and the Idealized Centerline.

Referring now to FIG. 3, the monitor output signal 35 from the photo detector 34 is shown as employed in means 40 for adjusting the position of the light source 14. More particularly, the monitor output signal 35 is directed toward compensating signal processing means 42 which develops an output signal 43 for operating a light source positioning motor 44. The signal processing 42 may comprise convention means such as analog synchronous motor feedback control and drive circuitry. The motor 44 may comprise a conventional device, such as a synchronous permanent magnet servo motor. The light source positioning motor 44 may be employed to displace the light source 14 in a single plane and/or in three dimensions. In one such application, the output 43 of the compensating signal processing means 42 is fed to the light source positioning motor 44 which then translates the light source 14 to reduce the deviation between the Idealized Centerline and the Actual Centerline. Preferably, a feedback loop 45 is provided between the positioning means 44 and the compensating signal processing means 42. This feedback loop 45 ensures that the correction of the light source position is completed. A second coupling 43' between the compensating signal processing 42 and the positioning means 44 is shown in phantom, as may be employed for three-dimensional positioning applications.

Referring now to the apparatus 50 of FIG. 4, the monitor output signal 35 is employed to develop a compensated measurement output signal 22. More particularly, monitor output signal 35 is coupled to compensating signal processing means 52 which develops a compensating signal 53 for compensating for the measurement error introduced by the deviation. The output 53 of signal processing 52 is coupled to the measurement intelligence means 20 along with the output 19 of photo detector 18. In the apparatus 50, the information from the photo detector 18 includes a measurement error due to the light source drift. However, the output 53 of the signal processing means 52 is introduced into the measurement intelligence 20 so as to compensate for the measurement error which would otherwise have been introduced via the photo detector 18. Accordingly, the measurement intelligence 20 develops a compensated measurement output signal 22' representing the output signal 22 of FIG. 1A compensated so as to reduce the measurement error. More particularly, the measurement intelligence means 20 may be provided with an arithmetic and logical unit so as to mathematically process input signals 53 and 19 to result in compensated measurement signal 22'.

Referring now to FIG. 5, a three-dimensional application of a portion of one form of the apparatus of the present invention is generally designated 60. The apparatus 60 is similar to the apparatus 30 of FIG. 2 so that, where possible, like numerals have been employed to represent like elements. In the three-dimensional apparatus 60, additional beam splitter 32' and monitor photo detector 34' are provided for monitoring centerline position in two planes which are preferably orthogonally related.

Although the present invention has been described in connection with workpieces and displacements thereof, it is to be appreciated that the method and apparatus of the present invention are generally applicable to optical triangulation applications. Indeed, the reflected measuring beam contains information with regard to various useful characteristics of the point of impact of the measuring beam on the workpiece. In this connection, the method and apparatus of the present invention are well suited for applications in which the point of impact information characterized by the reflected measuring beam is employed to determine material, surface contours, coating characteristics, and/or structural characteristics of a workpiece. For example, the method and apparatus of the present invention is particularly well suited for aircraft engine nondestructive testing applications such as those in which blade and other hot engine part structures are examined.

Also, although the present invention has been described as including a number of output signals in the form of electrical signals, it is to be appreciated that such output signals may take other forms, such as, for example, optical signals. Also, it is to be appreciated that the Idealized Centerline is merely an arbitrary reference upon which the appropriate geometric measurement is made. Thus, the Idealized Centerline is simply a reference which is chosen for convenience and may be altered, where appropriate.

Further, by the term, light source, it is meant a source of electromagnetic radiation which may, for example, provide radiation in the range of far infrared to high ultraviolet. In this connection, collimated light sources, such as conventional laser devices, may be employed.

While the present invention has been described with reference to specific embodiments thereof, it will be obvious to those skilled in the art that various changes and modifications may be made without departing from the invention in its broader aspects. It is contemplated in the appended claims to cover all variations and modifications of the invention which come within the true spirit and scope of my invention.

What is claimed as new and desired to be secured by Letters Patent of the United States is:

1. In combination with optical triangulation measurement apparatus of the type having a light source positioned to provide a measuring beam directed to a workpiece, the light source having an idealized centerline and an actual centerline with the deviation therebetween introducing a measurement error, a photo detector positioned to receive a portion of the measuring beam reflected from the workpiece with a portion of the reflected measuring beam characterized by being representative of the point of impact of the measuring beam on the workpiece and wherein the photo detector develops a photo detector output signal representative of the point of impact of the measuring beam on the photo detector, and measurement intelligence means for receiving said photo detector output signal and developing a measurement output signal representative of the point of impact of the measuring beam on the workpiece, wherein the improvement comprises:
means for monitoring the relationship between the idealized centerline and the actual centerline and developing a monitor output signal representative of the deviation therebetween.

2. Optical triangulation measurement apparatus in accordance with claim 1 which includes means responsive to said monitor output signal for translating said light source to reduce said deviation and the measurement error.

3. Optical triangulation measurement apparatus in accordance with claim 1 which includes compensating signal processing means responsive to said monitor output signal for developing a compensating signal for compensating for the measurement error introduced by said deviation.

4. Optical triangulation measurement apparatus in accordance with claim 3 in which said measurement intelligence means includes signal processing means for receiving said compensating signal and developing a compensated measurement output signal which exhibits reduced measurement error with respect to said measurement output signal.

5. Optical triangulation measurement apparatus in accordance with claim 1 in which said means for monitoring comprises:
beam splitter means positioned to receive the measuring beam from said light source wherein a major portion of the measuring beam passes therethrough and a minor portion of the measurement beam is reflected therefrom;
monitor photo detector means positioned to receive a portion of the measuring beam reflected from said beam splitter means wherein said portion of said reflected measuring beam striking the monitor photo detector means represents the actual centerline of said light source; and
photo detector signal processing means for comparing the point of impact of said reflected measuring beam on said monitor photo detector means with a point of impact associated with the idealized centerline of said light source and developing said monitor output signal.

6. In a method of optical triangulation measurement of the type in which a light source is positioned to provide a measuring beam directed to a workpiece wherein the light source has an idealized centerline and an actual centerline with the deviation therebetween introducing a measurement error and in which a photo detector is positioned to receive a portion of the measurement beam which is reflected from the workpiece, wherein the method further comprises the step of:
monitoring the relationship between the idealized centerline and the actual centerline and developing a monitor output representative of the deviation therebetween.

7. A method in accordance with claim 6 which includes the step of reducing the measurement error by translating said light source to reduce said deviation.

8. A method in accordance with claim 6 which includes the step of reducing the measurement error by compensating for said deviation.

* * * * *